(12) United States Patent
Arnault et al.

(10) Patent No.: US 11,674,586 B2
(45) Date of Patent: Jun. 13, 2023

(54) PULLEY DEVICE FOR A TENSIONER ROLLER OR WINDING ROLLER

(71) Applicant: Aktiebolaget SKF, Gothenburg (SE)

(72) Inventors: Benoit Arnault, Saint-Cyr-sur-Loire (FR); Benoît Hauvespre, Saint Etienne de Chigny (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 170 days.

(21) Appl. No.: 17/225,270

(22) Filed: Apr. 8, 2021

(65) Prior Publication Data
US 2021/0222766 A1  Jul. 22, 2021

Related U.S. Application Data

(62) Division of application No. 16/362,915, filed on Mar. 25, 2019, now Pat. No. 11,168,780.

(30) Foreign Application Priority Data

Apr. 3, 2018 (FR) ........................................ 1852856

(51) Int. Cl.
| | |
|---|---|
| F16H 57/00 | (2012.01) |
| F16C 19/06 | (2006.01) |
| F16H 7/12 | (2006.01) |
| F16H 55/36 | (2006.01) |
| F16H 7/08 | (2006.01) |

(Continued)

(52) U.S. Cl.
CPC ......... *F16H 57/0031* (2013.01); *F16C 19/06* (2013.01); *F16C 19/18* (2013.01); *F16H 7/08* (2013.01); *F16H 7/12* (2013.01); *F16H 7/20* (2013.01); *F16H 55/36* (2013.01); *F16C 2361/63* (2013.01); *F16H 2007/0865* (2013.01)

(58) Field of Classification Search
CPC ................... F16H 57/0031; F16H 7/12; F16H 2007/0865; F16H 55/36; F16H 7/20; F16C 2361/63; F16C 13/006
USPC ........................................................ 474/199
See application file for complete search history.

(56) References Cited

U.S. PATENT DOCUMENTS 1,627,558 A * 5/1927 Grunwald ............. F16C 13/006
 29/524.1
1,848,144 A * 3/1932 Pribil ........................ B60L 5/06
 474/199

(Continued)

FOREIGN PATENT DOCUMENTS

CN 105387065 A 3/2016
DE 102007049906 A1 4/2009
(Continued)

*Primary Examiner* — Henry Y Liu
(74) *Attorney, Agent, or Firm* — Garcia-Zamor Intellectual Property Law, LLC; Ruy Garcia-Zamor

(57) ABSTRACT

A pulley device for a tensioner roller or winding roller of a transmission element, having a fixed inner element configured to receive a screw, a rotating outer element that is mounted to rotate coaxially about the fixed inner element and is intended to cooperate with the transmission element, and an annular protective flange bearing against a lateral surface of the fixed inner element. The fixed inner element provides a sleeve axially protruding from the lateral surface. The flange provides an inner axial portion mounted securely on an outer surface of the sleeve.

9 Claims, 3 Drawing Sheets

(51) Int. Cl.
*F16C 19/18* (2006.01)
*F16H 7/20* (2006.01)

(56) References Cited

U.S. PATENT DOCUMENTS

| | | | | | |
|---|---|---|---|---|---|
| 1,990,805 | A | * | 2/1935 | Watson | B65G 39/02 384/418 |
| 2,137,987 | A | * | 11/1938 | Smith | F16H 7/18 384/547 |
| 2,349,281 | A | * | 5/1944 | Kendall | F16H 7/20 384/547 |
| 2,669,878 | A | * | 2/1954 | Nelson | F16H 55/44 474/181 |
| 3,490,285 | A | * | 1/1970 | Walter | F16H 7/12 474/187 |
| 3,822,605 | A | * | 7/1974 | Schurger | D06F 37/36 474/199 |
| 4,402,678 | A | * | 9/1983 | St. John | B23P 11/00 474/171 |
| 4,518,372 | A | * | 5/1985 | Dye | F16C 13/006 474/94 |
| 4,602,875 | A | * | 7/1986 | Doerr | F16C 13/006 384/488 |
| 4,610,646 | A | * | 9/1986 | Walter | F16H 7/20 474/197 |
| 4,792,243 | A | * | 12/1988 | Takeuchi | F16C 33/7896 384/132 |
| 5,517,957 | A | * | 5/1996 | Wagner | F16D 41/066 123/192.1 |
| 5,630,769 | A | * | 5/1997 | Schmidt | F16C 13/006 474/902 |
| 6,042,272 | A | * | 3/2000 | Nagase | F16C 33/7896 384/486 |
| 6,065,879 | A | * | 5/2000 | Mitsue | F16C 41/007 277/565 |
| 6,220,982 | B1 | * | 4/2001 | Kawashima | F16H 55/44 384/536 |
| 6,241,257 | B1 | * | 6/2001 | Hauck | F16C 13/006 384/489 |
| 6,293,885 | B1 | * | 9/2001 | Serkh | F16H 55/44 474/133 |
| 6,357,926 | B1 | * | 3/2002 | Hauck | F16C 33/76 384/546 |
| 6,860,639 | B2 | * | 3/2005 | Tabuchi | F16C 35/067 384/537 |
| 7,011,593 | B2 | * | 3/2006 | Schenk | F16H 7/20 384/477 |
| 7,041,020 | B2 | * | 5/2006 | Singer | F16C 41/04 474/166 |
| 7,056,247 | B2 | * | 6/2006 | Fujiwara | F16H 55/36 474/166 |
| 7,419,448 | B2 | * | 9/2008 | Miyata | F16H 55/36 474/139 |
| 7,448,806 | B2 | * | 11/2008 | Ishiguro | F04B 27/1063 384/417 |
| 7,563,187 | B2 | * | 7/2009 | Miyata | F16H 7/20 474/139 |
| 7,588,372 | B2 | * | 9/2009 | Fournier | F16C 29/045 384/488 |
| 7,681,888 | B2 | * | 3/2010 | Kurosawa | B62D 5/083 277/572 |
| 7,695,385 | B2 | * | 4/2010 | Barraud | F16C 41/04 474/199 |
| 7,758,459 | B2 | * | 7/2010 | Gaborel | F16H 55/54 474/178 |
| 7,909,717 | B2 | * | 3/2011 | Boussaguet | F16C 33/76 474/136 |
| 8,012,053 | B2 | * | 9/2011 | Filip | F16H 7/20 474/49 |
| 8,172,056 | B2 | * | 5/2012 | Barraud | F16D 41/069 192/113.32 |
| 8,235,851 | B2 | * | 8/2012 | Eidloth | F16C 33/7859 474/199 |
| 8,651,988 | B2 | * | 2/2014 | Kapfer | F16C 13/006 474/135 |
| 8,905,879 | B2 | * | 12/2014 | Lannutti | F16J 15/3456 474/166 |
| 9,206,838 | B2 | * | 12/2015 | Mola | F16C 13/006 |
| 9,279,456 | B2 | * | 3/2016 | Little | F16C 23/084 |
| 9,464,700 | B2 | * | 10/2016 | Hedman | F16C 13/006 |
| 9,702,399 | B2 | * | 7/2017 | Arnault | F16C 13/006 |
| 9,709,154 | B2 | * | 7/2017 | Albrecht | F16B 41/002 |
| 9,810,308 | B2 | * | 11/2017 | Quincay | F16C 35/073 |
| 9,958,012 | B2 | * | 5/2018 | Nakata | F16J 15/3256 |
| 11,060,598 | B2 | * | 7/2021 | Arnault | F16H 7/08 |
| 2006/0045400 | A1 | * | 3/2006 | Yamamoto | G01P 3/446 384/448 |
| 2006/0177167 | A1 | * | 8/2006 | Tsujimoto | F16C 33/7896 384/486 |
| 2006/0188190 | A1 | * | 8/2006 | Schmidl | F16J 15/4472 384/477 |
| 2009/0191999 | A1 | * | 7/2009 | Joseph | F16H 55/36 384/485 |
| 2009/0226124 | A1 | * | 9/2009 | Nakagawa | F16J 15/164 384/478 |
| 2011/0070987 | A1 | * | 3/2011 | Swane | B29C 45/14467 384/489 |
| 2011/0075958 | A1 | * | 3/2011 | Yamaguchi | F16C 33/7859 384/484 |
| 2015/0141185 | A1 | * | 5/2015 | Albrecht | F16H 7/20 474/199 |
| 2015/0176641 | A1 | * | 6/2015 | Arnault | F16H 7/20 29/895.21 |
| 2015/0267790 | A1 | * | 9/2015 | Hedman | F16H 7/20 474/199 |
| 2015/0292603 | A1 | * | 10/2015 | Cherioux | F16C 33/7886 474/166 |
| 2017/0059013 | A1 | * | 3/2017 | Capoldi | F16H 7/20 |
| 2019/0277388 | A1 | * | 9/2019 | Arnault | F16C 19/08 |
| 2020/0386304 | A1 | * | 12/2020 | Arnault | F16H 55/44 |

FOREIGN PATENT DOCUMENTS

| | | |
|---|---|---|
| FR | 2774446 A1 | 8/1999 |
| FR | 3013093 A1 | 5/2015 |
| FR | 3017677 A1 | 8/2015 |

* cited by examiner

PULLEY DEVICE FOR A TENSIONER ROLLER OR WINDING ROLLER

CROSS-REFERENCE

This divisional application claims priority to U.S. patent application Ser. No. 16/362,915 filed on Mar. 25, 2019, which claims the benefit of French patent application number 1852856, filed on Apr. 3, 2018, the contents of which are all fully incorporated herein by reference.

TECHNOLOGICAL FIELD

The present invention relates to the field of pulley devices for tensioner rollers or winding rollers that are intended to cooperate with a transmission element, for example a timing belt or chain or a drive belt or chain of a motor vehicle internal combustion engine.

BACKGROUND

Such rollers serve generally to permanently maintain tension in the transmission element in a given range or to locally modify the path taken thereby. The rollers are thus referred to as tensioner rollers and winding rollers, respectively. In winding rollers, the pulley is rotatably mounted on a threaded screw body via a bearing, the roller then being fixed directly or indirectly to the engine block or to an element of a tensioner roller device, for example an articulated arm or an eccentric.

The bearing generally provides a fixed inner ring having a bore through which the screw passes, a rotating outer ring surmounted by the pulley, and at least one row of rolling elements interposed between the rings.

Such devices are often equipped with additional protective flanges that help to protect the device from contaminants or spatter originating from the outside environment. The flange also serves as a thrust washer for the head of the screw.

However, particles or other polluting elements can get between the flange and the bearing of the pulley device. The bearing is generally provided with additional sealing means inherent thereto, for example seals which close the bearing chamber in which the rolling elements are housed, and which are able to stop this pollution.

SUMMARY

The present invention aims to remedy this drawback.

More particularly, the present invention aims to provide a pulley device that is resistant to high levels of pollution, is particularly economical, is easy and safe to mount, forming a subassembly that is incapable of being dismantled, and has a smaller axial and radial space requirement.

The invention relates to a pulley device for a tensioner roller or winding roller for a transmission element, comprising a fixed inner element, a rotating outer element, and a protective flange.

The fixed inner element provides a mounting bore for the device that is intended to take a screw.

The rotating outer element is mounted so as to rotate coaxially about the fixed inner element and provides an outer surface intended to cooperate with the transmission element.

The protective flange is annular and provides a substantially radial portion bearing against a lateral surface of the fixed inner element, the substantially radial portion having an inner edge forming a bore of the flange.

According to the invention, the fixed inner element provides a sleeve axially protruding from the lateral surface in an outward axial direction from the device and extending in the bore of the flange. The flange provides an inner axial portion extending from the inner edge of the substantially radial portion in an outward axial direction of the pulley device. The inner axial portion is mounted securely on an outer surface of the sleeve.

According to further advantageous but non-essential features of the invention, taken on their own or in combination:

The pulley device provides a bearing having a rotating outer ring that is part of the fixed inner element, a fixed inner ring that is part of the rotating outer element, the rings being coaxial and forming a radial space between one another, sealing means that close the radial space on each axial side, and at least one row of rolling elements arranged in the radial space.

The inner ring of the bearing provides a bore forming the mounting bore of the device that is intended to take a screw, the fixed inner element consisting of the fixed inner ring of the bearing.

The bearing provides an annular spacer mounted in a bore of the inner ring of the bearing, the spacer being provided with a bore forming the mounting bore of the device that is intended to take a screw, the fixed inner element consisting of the fixed inner ring and the spacer of the bearing.

The fixed inner ring of the bearing is provided with the axially protruding sleeve.

The spacer is provided with the axially protruding sleeve.

The mounting bore of the device provides a first bore part of small diameter and a second bore part of large diameter. The second bore part is at least partially provided on the axially protruding sleeve, and the two bore parts are axially adjacent so as to form an inner annular shoulder with a lateral face that is open on the outer axial side of the pulley device. The first bore part is intended to take a threaded body of a screw, and the second bore part is intended to at least partially take a head of the screw coming to bear axially against the lateral surface of the shoulder.

The device provides a pulley mounted on the rotating outer ring of the bearing, the pulley being provided with an outer surface intended to cooperate directly with a transmission element, the rotating outer element consisting of the pulley and the outer ring of the bearing.

The rotating outer ring of the bearing provides an outer surface intended to cooperate directly with a transmission element, the rotating outer element consisting of the outer ring of the bearing.

The rolling elements are balls.

A cage maintains the circumferential spacing of the rolling elements.

The substantially radial portion of the flange is provided with an outer edge that passes into the immediate vicinity of a portion of the rotating outer element so as to form a narrow passage.

The rotating outer element provides an axially protruding portion that is directed towards the outside of the bearing and radially surrounds the outer edge of the flange.

The flange provides an annular collar that extends axially from the outer edge of the substantially radial portion and forms a narrow passage with the axially protruding portion of the rotating outer element.

The collar extends from the outer edge of the substantially radial portion in an outward axial direction of the pulley device.

The collar extends from the outer edge of the substantially radial portion in an inward axial direction of the pulley device.

The collar is cylindrical.

The collar is frustoconical.

The inner axial portion of the flange is annular and forms a tube.

The inner axial portion of the flange provides at least one tab.

The inner axial portion of the flange is mounted tightly on the sleeve.

The inner axial portion of the flange provides a portion folded in a substantially radial direction towards the inside of the pulley device.

The folded portion is crimped to the outer surface of the sleeve.

The folded portion is housed in a recess provided in the outer surface of the sleeve.

The folded portion is frustoconical.

The folded portion is annular.

The folded portion consists of at least one tab.

The recess consists of a circumferential groove.

The pulley is made of metal, for example of steel.

The pulley is made of plastics material, for example of polyamide.

The pulley is formed by overmoulding plastics material on the outer ring of the bearing.

The flange is made of metal, for example of steel.

The flange is made of plastics material, for example of polyamide.

BRIEF DESCRIPTION OF THE DRAWINGS

The present invention will be understood better from reading the detailed description of a number of embodiments, which are given by way of entirely non-limiting example and are illustrated in the appended drawings, in which.

DETAILED DESCRIPTION

Figure 1:
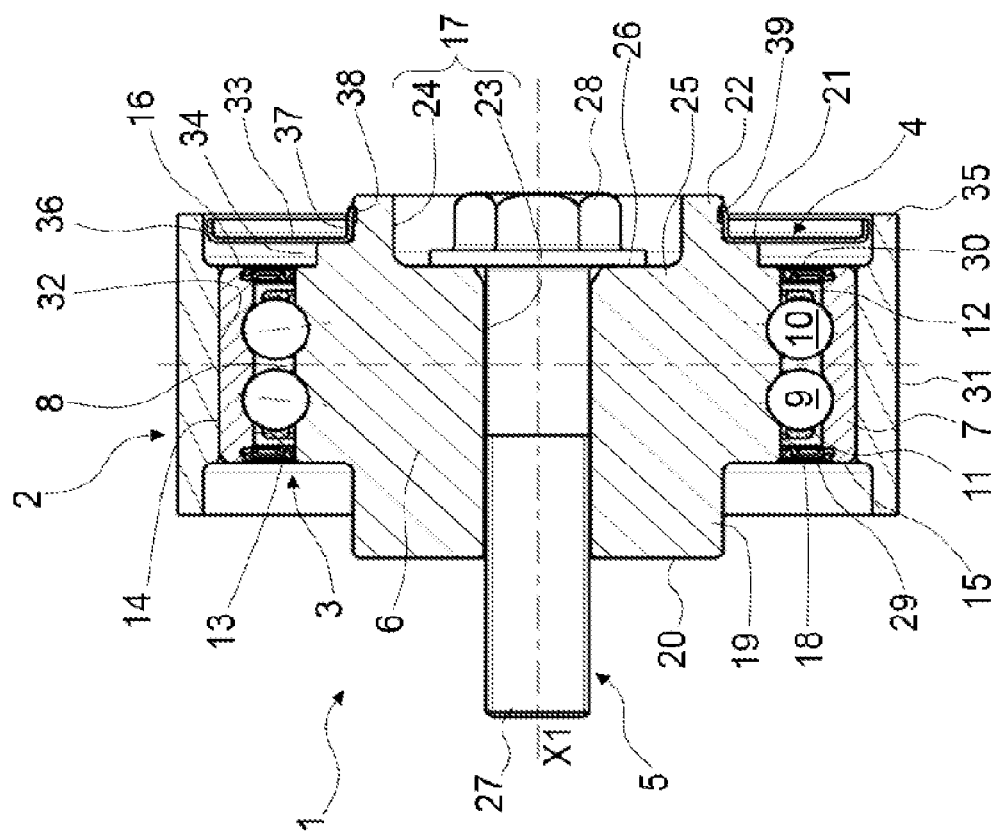
FIG. 1 is a view in axial section of a pulley device according to a first embodiment.

As can be seen in FIG. 1, a pulley device for a tensioner roller or winding roller of a belt, bearing the overall reference 1, has a geometric axis X1 and provides a pulley 2 designed to cooperate with a transmission element (not shown) such as a belt or a chain, a bearing 3, a protective flange 4, and a screw 5.

The bearing 3 provides a fixed inner ring 6, a rotating outer ring 7, the rings 6, 7 being coaxial about the axis X1 and forming a radial space 8 between one another. The bearing 3 also provides two rows of rolling elements 9 and 10, in the form of balls here, that are disposed between the rings, and cages 11 and 12 that maintain the circumferential spacing of the rolling elements 9 and 10, respectively.

The inner ring 6 and outer ring 7 are concentric. In the exemplary embodiment illustrated, the rings are solid, that is to say obtained by machining or grinding with removal of material from metal tubes, bars, forged parts or rolled blanks.

The outer ring 7 provides a cylindrical bore 13 provided with raceways that have, in axial section, a concave internal profile suitable for the rolling elements 9, 10, an outer cylindrical surface 14 on which the pulley 2 is mounted, and two front surfaces 15, 16.

The inner ring 6 provides a central bore 17 and an outer cylindrical surface 18 provided with raceways that have, in axial section, a concave internal profile suitable for the rolling elements 9, 10.

The inner ring 6 extends axially out of the outer ring 7 in the axial direction towards a support on which the pulley device 1 is intended to be mounted. The inner ring 6 advantageously provides a radial rim 19 affording a bearing surface 20 for the device 1 against the support.

On the axially opposite side from this bearing surface 20, the inner ring 6 provides an annular lateral surface 21, against which the flange 4 comes to bear axially, and a sleeve 22 axially protruding from the lateral surface 21 in an outward axial direction of the device 1.

The central bore 17 provides a first bore part 23 of small diameter and a second bore part 24 of large diameter. The second bore part 24 is at least partially provided on the axially protruding sleeve 22. The two bore parts 23, 24 are axially adjacent so as to form an inner annular shoulder 25 with a lateral face 26 that is open on the outer axial side of the pulley device 1.

The first bore part 23 is intended to take a threaded body 27 of the screw 5, the threaded body 27 being intended to be fixed in a corresponding tapped opening in the support for the device 1.

The second bore part 24 is intended to take a head 28 of the screw 5. In the embodiment illustrated, the head 28 is housed entirely in the cavity formed by the second bore part 24 of large diameter. The head 28 has a substantially flat lower face that comes to bear axially against the lateral surface 26 of the shoulder 25.

The inner ring 6 forms only a fixed inner element for the pulley device 1, and the bore 17 of the inner ring 6 forms the mounting bore for the device 1.

Alternatively, the bearing may provide a different number of rows of rolling elements arranged between the outer and inner rings, for example a single row of rolling elements.

Alternatively, the bearing may provide other types of rolling elements, for example tapered rollers or needles. Alternatively, the bearing may be a plain bearing.

The bearing 3 advantageously provides, on each axial side of the radial space 8, an annular seal 29, 30 for closing the radial space between the rings 6, 7 and inside which the rolling elements 9, 10 are housed.

The seals 29, 30 advantageously each provide a first end fixed in a circumferential groove provided in the bore 13 of the outer ring 6, and a second end formed by a lip in sliding contact with the outer cylindrical surface 18 of the inner ring 6. The radial space 8 is thus closed in a sealed manner axially between the two seals 29, 30.

In this embodiment, the pulley device 1 provides a pulley 2. The pulley 2 provides an outer cylindrical surface 31, and an inner surface 32 secured to the outer ring 7. The pulley has a substantially tubular shape and is centered on the central axis X1.

The pulley 2 may advantageously be made of plastics material, and preferably of polyamide, for example of PA6 or PA66. The pulley 2 may advantageously be formed by overmoulding plastics material on the outer ring 7 of the bearing 3. This results in excellent cohesion between these parts. Alternatively, the pulley 2 may be made of metal material, for example of steel, and be mounted tightly on the outer cylindrical surface 14 of the outer ring 7. The pulley 2 may also have other shapes that are optimized depending on the needs of the application.

The rotating outer ring 7 of the bearing 3 and the pulley 2 form a rotating outer element for the pulley device 1. The outer surface 31 of the pulley 2 forms an outer surface of the rotating outer element that is able to cooperate with a transmission element, such as a belt or a chain.

According to an alternative embodiment that is not shown, the pulley device 1 does not provide a pulley separate from the bearing 3. The function of rotational support and path guide with the transmission element is ensured by the outer surface 14 of the outer ring 7. In this case, the rotating outer ring 7 of the bearing 3 forms only the rotating outer element of the pulley device.

The protective flange 4 provides a substantially radial portion 33. The substantially radial portion 33 extends between an inner edge forming the bore of the flange 4 and an outer edge.

According to an alternative embodiment that is not shown, the substantially radial portion may provide a first radial portion of small diameter, a second radial portion of large diameter, and an intermediate portion that extends substantially axially and connects the first and second radial portions.

The substantially radial portion 33 comes to bear against the lateral surface 21 of the inner ring 6. The sleeve 22 of the inner ring 6 is mounted in the inner edge of the radial portion 33 of the flange 4.

The inner ring 6 provides a circumferential groove 34, which is formed between the lateral bearing surface 21 of the flange 4 and the outer cylindrical surface 18 of the inner ring. The groove 34 and the radial portion 33 of the flange form a circumferential trough. The bottom of the circumferential trough 34 is offset radially towards the inside of the pulley device 1, that is to say in the direction of the axis X1, compared with the outer edge of the outer cylindrical surface 18 of the fixed inner ring 6. The contaminants that get through the narrow passage defined between the flange 4 and the pulley 2 are collected in the trough 34 at a certain distance from the edge of the inner ring 6 of the bearing, and more particularly at a certain distance from the seal 30.

The outer edge of the substantially radial portion 33 passes into the immediate vicinity of the pulley 2 so as to form a narrow passage for limiting the ingress of pollution into the device. More specifically, the flange provides a cylindrical annular collar 36 extending axially from the outer edge of the flange 4 towards the outside of the pulley device 1.

The collar 36 passes radially into the immediate vicinity of an axially protruding annular portion 35 of the pulley 2 so as to form a narrow passage. The annular portion 35 extends axially beyond the radial plane along the front surface 16 of the outer ring 7 and also beyond the radial plane along the lateral surface 32 of the inner ring 6.

The collar 36 is radially surrounded by the axially protruding annular portion 35 of the pulley 2. The collar 36 and a surface on the inside of the portion 35 both extend axially and radially face one another, an annular space being defined therebetween. Particularly advantageously, the collar 36 and a surface on the inside of the portion 35 have matching shapes. The collar 36 and the protruding portion 35 of the pulley 2 thus define a narrow passage which extends axially along a certain length. In this way, sealing between the flange 4 and the pulley 2 is improved.

Alternatively, the collar may face in the opposite axial direction. Alternatively, the collar may be frustoconical or any other suitable shape for ensuring that the device 1 is sealed.

Figure 2:
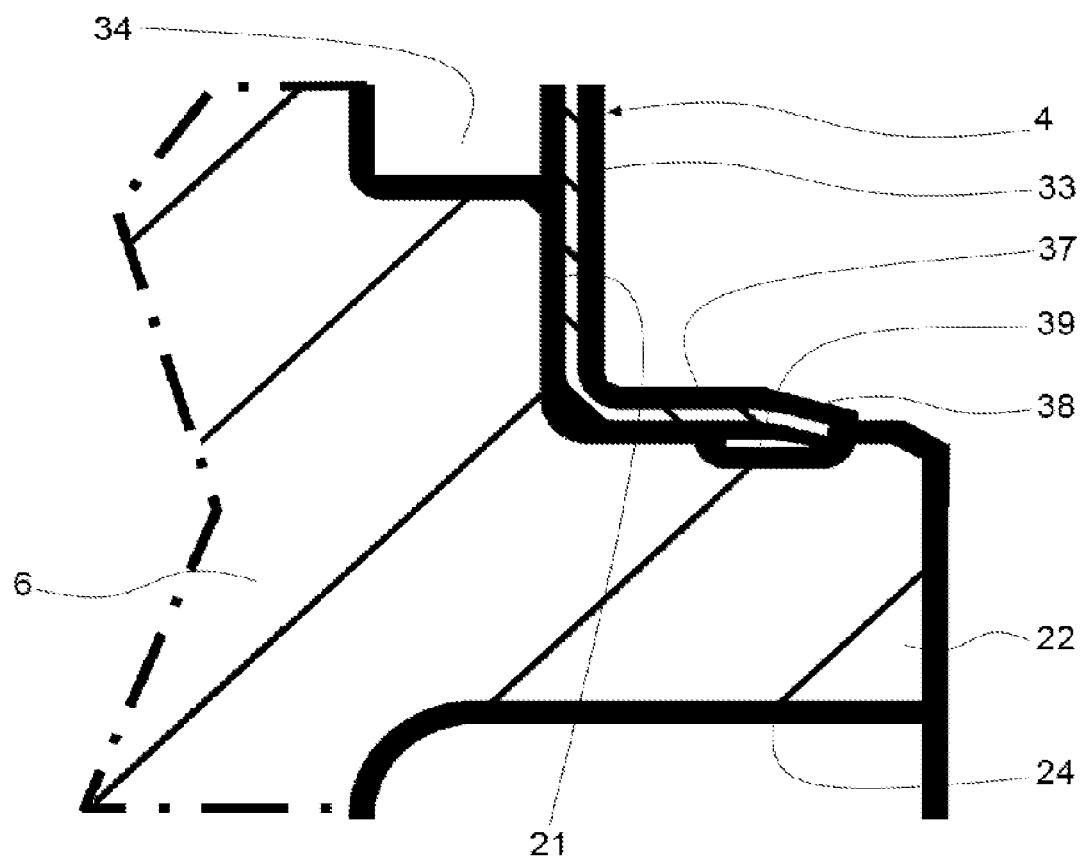
FIG. 2 is a detail view of FIG. 1.

As illustrated in FIG. 2, the flange 4 also provides an axial portion 37 extending from the inner edge of the radial portion 33 in an outward axial direction of the pulley device 1. The axial portion 37 is mounted securely on a cylindrical annular outer surface of the axially protruding sleeve 22 of the inner ring 6 of the bearing 3.

The inner axial portion 37 of the flange 4 is annular and forms a tube. Alternatively, the inner axial portion of the flange may provide one or more tabs.

According to the embodiment illustrated in FIG. 1, the inner axial portion 37 of the flange 4 provides a folded portion 38 at its free axial end. The folded portion 38 extends in a substantially radial direction towards the inside of the pulley device 1, that is to say towards the central axis X1.

The folded portion 38 may consist of one or more circumferentially distributed tabs at the end of the inner axial portion 37. Alternatively, the folded portion may consist of an annular rim.

In the embodiment illustrated in FIG. 1, the folded portion 38 is frustoconical. Alternatively, the folded portion 38 may be cylindrical, rounded, or any other shape extending in a substantially radial direction towards the inside of the device 1.

The folded portion 38 is advantageously housed in a recess 39 provided in the outer surface of the axially protruding sleeve 22 of the fixed inner ring 6. In the embodiment illustrated, the recess consists of a circumferential groove 39.

The flange 4 is thus retained axially and radially on the fixed inner ring 6 of the bearing 3.

Alternatively, the folded portion 38 of the inner axial portion 37 of the flange 4 may be crimped to the outer surface of the sleeve 22. During a crimping operation, the free axial end of the inner axial portion 37 is deformed against the outer surface of the sleeve 22, and also deforms the surface. The folded portion 38 thus forms a kind of retaining "claw" with the sleeve 22. The folded portion 38 can also be caulked locally and deform the outer surface of the sleeve 22.

According to an alternative embodiment that is not illustrated, the inner axial portion of the flange may be secured to the sleeve 22 by being mounted tightly in the mounting bore of the device.

The flange is formed by cutting out and then stamping a strip of metal, for example steel. Alternatively, the flange can be made of plastics material, for example of polyamide.

Figure 3:
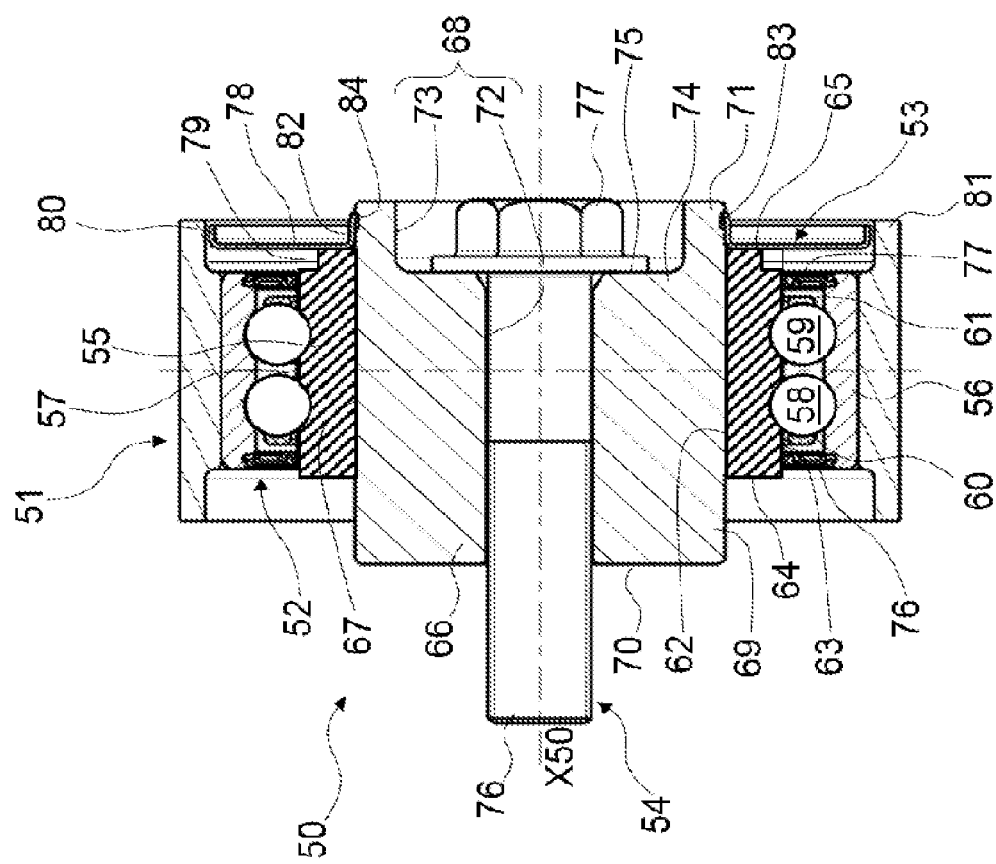
FIG. 3 is a view in axial section of a pulley device according to a second embodiment.

A second embodiment of the invention is illustrated in FIG. 3, and differs from the first embodiment in that a bearing provides an inner ring and a spacer housed in the inner ring.

The pulley device 50 illustrated in FIG. 3 has a geometric axis X50 and provides a pulley 51 designed to cooperate with a transmission element (not shown) such as a belt or a chain, a bearing 52, a protective flange 53, and a screw 54.

The bearing 52 provides a fixed inner ring 55, a rotating outer ring 56, the rings 55, 56 being coaxial about the axis X50 and forming a radial space 57 between one another. The bearing 52 also provides two rows of rolling elements 58 and 59, in the form of balls here, that are disposed between the rings, and cages 60 and 61 that maintain the circumferential spacing of the rolling elements 58 and 59, respectively.

The rotating outer ring 56 is similar to the rotating outer ring 7 described above for the first embodiment and will not be described in more detail.

The inner ring 55 provides a central bore 62, an outer cylindrical surface 63 provided with raceways that have, in axial section, a concave internal profile suitable for the rolling elements 58, 59, and a rear front surface 64, and a forward front surface 65.

In the embodiment illustrated in FIG. 3, the bearing 52 also provides a spacer 66. The spacer 66 is annular and is provided with an outer surface 67 mounted in the bore 62 of the inner ring 55, and with a central bore 68.

The spacer 66 is advantageously mounted securely in the inner ring 55. In the embodiment illustrated, the outer surface 67 of the spacer 66 is mounted tightly in the bore 62 of the inner ring 55. The spacer 66 may be secured to the inner ring 55 by any other suitable means, for example by adhesive bonding or crimping. Alternatively, the spacer may simply be mounted freely in the inner ring of the bearing.

In this embodiment, the bore 68 of the spacer is coaxial with the bore 62 of the inner ring 55. Alternatively, the axis of the bore 68 may be offset with respect to the axis of the bore 62, the spacer 66 then forming an eccentric.

The spacer 66 extends axially out of the bearing 52 in the axial direction towards a support on which the pulley device 50 is intended to be mounted. More particularly, the spacer 64 provides a rear sleeve 69 that extends axially beyond a radial plane formed by the rear front surface 64 of the fixed inner ring 55. The rear sleeve offers a bearing surface 70 for the device 50 against the support to which it is intended to be fixed. According to an embodiment that is not shown, the spacer 66 may be provided with a rear rim provided with the bearing surface 70 on one axial side, and on the opposite axial side with a bearing surface for the rear front surface 64 of the fixed inner ring 55.

Such a spacer 66 makes it possible to alter the spacing between the pulley device 50 and the support thereof depending on the application. In addition, a bearing 52 of standard dimensions can be used in a plurality of applications, only the spacer 66 then being specifically adapted to the dimensions required by the application. This makes it possible to minimize the manufacturing costs of the bearing 52 and to simplify stock management with a limited range of bearings.

On the axially opposite side from this bearing surface 70, the spacer 68 extends axially beyond a radial plane formed by the forward front surface 65 of the fixed inner ring 55. The spacer 68 provides a front sleeve 71 axially protruding with respect to the front surface 65 of the fixed inner ring 55.

The fixed inner ring 55 and the spacer 66 of the bearing 52 form a fixed inner element for the pulley device 1. The bore 68 of the spacer 66 forms a mounting bore for the device 50.

The central bore 68 of the spacer 66 provides a first bore part 72 of small diameter and a second bore part 73 of large diameter. The second bore part 73 is at least partially provided on the axially protruding sleeve 71. The two bore parts 72, 73 are axially adjacent so as to form an inner annular shoulder 74 with a lateral face 75 that is open on the outer axial side of the pulley device 50.

The first bore part 72 is intended to take a threaded body 76 of the screw 54, the threaded body 76 being intended to be fixed in a corresponding tapped opening in the support for the device 50.

The second bore part 73 is intended to take a head 77 of the screw 54. In the embodiment illustrated, the head 77 is housed entirely in the cavity formed by the second bore part 73 of large diameter. The head 77 has a substantially flat lower face that comes to bear axially against the lateral surface 75 of the shoulder 74.

Alternatively, the bearing may provide a different number of rows of rolling elements arranged between the outer and inner rings, for example a single row of rolling elements.

Alternatively, the bearing may provide other types of rolling elements, for example tapered rollers or needles. Alternatively, the bearing may be a plain bearing.

The bearing 52 advantageously provides, on each axial side of the radial space 57, an annular seal 76, 77 for closing the radial space between the rings 55, 56 and inside which the rolling elements 58, 59 are housed.

In this embodiment, the pulley device 50 provides a pulley 51. The pulley 51 is similar to the pulley 2 described above for the first embodiment and will not be described in more detail.

The rotating outer ring 56 of the bearing 52 and the pulley 51 form a rotating outer element for the pulley device 50. According to an alternative embodiment that is not shown, the pulley device 50 does not provide a pulley separate from the bearing 52, the rotating outer ring 56 of the bearing 3 in this case forming the rotating outer element of the pulley device.

The protective flange 53 provides a substantially radial portion 78, which extends between an inner edge forming the bore of the flange 53 and an outer edge.

The substantially radial portion 78 comes to bear against the forward front surface 65 of the inner ring 55. The sleeve 71 of the spacer 66 is mounted in the inner edge of the radial portion 78 of the flange 53.

The inner ring 55 provides a circumferential groove 79, which is formed between the forward front bearing surface 65 of the flange 53 and the outer cylindrical surface 63 of the inner ring 55. The groove 79 and the radial portion 78 of the flange 53 form a circumferential trough. The bottom of the circumferential trough 79 is offset radially towards the inside of the pulley device 50, that is to say in the direction of the axis X50, compared with the outer edge of the outer cylindrical surface 63.

The outer edge of the substantially radial portion 78 is provided with a collar 80, which passes into the immediate vicinity of an axially protruding annular portion 81 of the pulley 2 so as to form a narrow passage for limiting the ingress of pollution into the device.

The flange 53 also provides an axial portion 82 extending from the inner edge of the radial portion 78 in an outward axial direction of the pulley device 50. The axial portion 82 is mounted securely on a cylindrical annular outer surface of the axially protruding sleeve 71 of the spacer 66.

The inner axial portion 82 provides a frustoconical folded portion 83 at its free axial end. The folded portion 83 extends in a substantially radial direction towards the inside of the pulley device 50, that is to say towards the central axis X50.

The folded portion 83 is advantageously housed in a circumferential groove 84 provided in the outer surface of the axially protruding sleeve 71 of the spacer 66. The flange 53 is thus retained axially and radially on the spacer 66, which is itself secured to the inner ring 55.

Moreover, all or only some of the technical features of the various embodiments can be combined with one another. Thus, the pulley device can be adapted in terms of cost, performance and ease of use.

What is claimed is:

1. A pulley device for a tensioner roller or winding roller of a transmission element, comprising:

a fixed inner element having a mounting bore for the device that is intended to take a screw, a rotating outer element that is mounted so as to rotate coaxially about the fixed inner element and provides an outer surface intended to cooperate with the transmission element, at least one row of roller elements located between radially between the fixed inner element and the rotating outer elements, an axially protruding annular portion having a middle section which contacts the outer surface of the rotating outer element, the axially protruding annular portion not contacting axial ends of the rotating outer element, the middle section having constant thickness and no gaps therein, the middle section axially overlapping the at least one row of roller elements, and an annular protective flange comprising a substantially radial portion bearing against a lateral surface of the fixed inner element, the substantially radial portion having an inner edge forming a bore of the flange, wherein the fixed inner element provides a sleeve axially protruding from the lateral surface in outward axial direction from the device and extending in the bore of the flange; and the flange provides an inner axial portion extending from the inner edge of the substantially radial portion in an outward axial direction of the pulley device, the inner axial portion being mounted securely on an outer surface of the sleeve.

2. The pulley device according to claim 1, further comprising a bearing having a rotating outer ring that is part of the fixed inner element, a fixed inner ring that is part of the rotating outer element, the rings being coaxial and forming a radial space between one another, sealing means that close the radial space on each axial side, and at least one row of rolling elements arranged in the radial space.

3. The pulley device according to claim 2, wherein the bearing comprises an annular spacer mounted in a bore of the inner ring of the bearing, the spacer being provided with a bore forming the mounting bore of the device that is intended to take a screw, and with the axially protruding sleeve, the fixed inner element consisting of the fixed inner ring and the spacer of the bearing.

4. The pulley device according to claim 1, wherein the mounting bore of the device comprises a first bore part of small diameter and a second bore part of large diameter, the second bore part being at least partially provided on the axially protruding sleeve, the two bore parts being axially adjacent so as to form an inner annular shoulder with a lateral face that is open on the outer axial side of the pulley device, such that the first bore part is intended to take a threaded body of a screw, and the second bore part is intended to at least partially take a head of the screw coming to bear axially against the lateral surface of the shoulder.

5. The pulley device according to claim 1, wherein the inner axial portion of the flange is mounted tightly on the sleeve.

6. The pulley device according to claim 5, wherein the inner axial portion comprises a portion folded in a substantially radial direction towards the inside of the pulley device.

7. The pulley device according to claim 6, wherein the folded portion is housed in a circumferential groove provided in the outer surface of the sleeve.

8. The pulley device according to claim 6, wherein the folded portion is annular.

9. The pulley device according to claim 6, wherein the folded portion consists of at least one tab.

* * * * *